(No Model.)
W. C. BARR & W. H. AXFORD.
Weighing-Scales.
No. 226,959. Patented April 27, 1880.
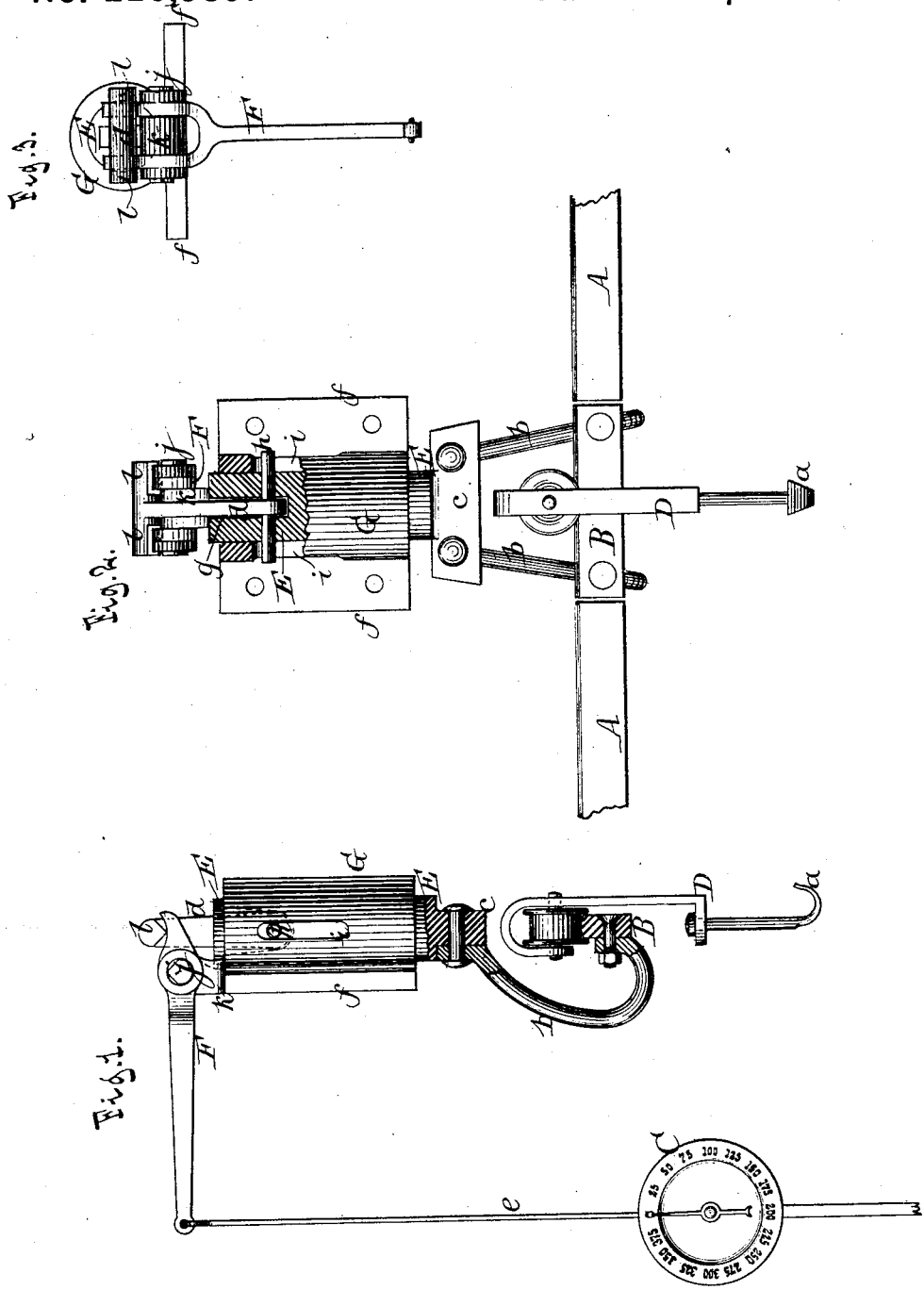
Witnesses:
Otto Hufeland,
William Miller.
Inventors:
William C. Barr,
William H. Axford,
by Van Santvoord & Hauff,
their attys.

UNITED STATES PATENT OFFICE.

WILLIAM C. BARR AND WILLIAM H. AXFORD, OF JERSEY CITY, N. J.

WEIGHING-SCALES.

SPECIFICATION forming part of Letters Patent No. 226,959, dated April 27, 1880.

Application filed March 17, 1880. (No model.)

*To all whom it may concern:*

Be it known that we, WILLIAM C. BARR and WILLIAM H. AXFORD, both citizens of the United States, residing at Jersey City, county of Hudson, and State of New Jersey, have invented new and useful Improvements in Weighing-Scales, of which the following is a specification.

This invention is especially adapted to scales for weighing the carcasses of hogs, sheep, or other animals.

The scales commonly used for this purpose consist of a detached section of an elevated rail and a spring-balance directly connected to such detached rail-section, the operation being to suspend the carcass from a carriage running on the elevated rail and bring this carriage onto the detached rail-section, thereby operating the spring-balance.

In this old style of scales the detached rail-section usually falls to such an extent, under the weight of the carriage, with its carcass, as to make it necessary to lift the carcass in order to permit the carriage to be brought therefrom onto the major portion of the rail. This is objectionable; and the aim of our invention is to so construct the scales referred to that the fall of the detached rail-section shall be reduced to a minimum.

This invention is illustrated in the accompanying drawings, in which Figure 1 shows our improved scales, partly in side view and partly in section. Fig. 2 is a front view thereof, partly in section. Fig. 3 is a plan view of the same.

Similar letters indicate corresponding parts.

The letter A designates a rail, of which a part or section is detached, as at B, the rest of the rail being fixed, and the whole being, in practice, elevated, as in a packing-house. C is the spring-balance, connecting with the rail-section B; and D a carriage adapted to travel on the whole rail, this carriage being equipped with a hook, $a$, or the like, for receiving the carcass to be weighed.

The spring-balance C is of ordinary construction, and for the purpose of connecting the rail-section B therewith we make use of the following mechanism: From the rail-section B rise arms $b$, whereby it connects with a cross-head, $c$, at the lower end of a vertical slide, E, at the upper end of which is a link, $d$, serving to connect the slide with the short arm of a lever, F, the long arm of which connects, by a rod or band, $e$, with the spring-balance C.

The vertical slide E is preferably made cylindrical, and it moves in a corresponding guide, G, which is provided with flanges $f$ for securing the same to a suitable support.

The link $d$ is fitted into a socket, $g$, in the upper end of the vertical slide E, and the pivot $h$, by which it is connected to the slide, projects from the slide at its opposite ends, and enters vertical slots $i\ i$ in the guide G, so that the slide moves up and down in the guide without being permitted to turn therein.

The lever F has its fulcrum on a pivot, $j$, which is mounted in a bracket, $k$, rising from the guide G, and the short arm of the lever is bifurcated, as shown in Fig. 3, while its branches form bearings for laterally-projecting pivots $l\ l$ at the upper end of the link $d$.

When a carcass is put on the carriage D and the latter is run on the rail-section B the spring-balance C is operated through the slide E and lever F. In this operation the slide E acts on the short arm of the lever F, and the result is that a comparatively extended motion of the spring-balance C is produced with a short movement of the slide E and the rail-section, so that the latter falls but a short distance below the level of the rail A, even with a heavy weight, and the carriage can be moved off from the rail-section without lifting the carcass.

What we claim as new, and desire to secure by Letters Patent, is—

In a weighing-scales, the combination, with the rail-section B and spring-balance C, of the slide E, lever F, link $d$, and connecting-rod $e$, the whole constructed and adapted to operate substantially as described.

In testimony whereof we have hereunto set our hands in the presence of two subscribing witnesses.

WILLIAM C. BARR.
    WILLIAM H. AXFORD.

Witnesses:
 W. HAUFF,
 CHAS. WAHLERS.